(12) United States Patent
Yamaoka

(10) Patent No.: US 7,413,007 B2
(45) Date of Patent: Aug. 19, 2008

(54) VEHICLE AIR-CONDITIONING SYSTEM

(75) Inventor: Daisuke Yamaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/110,225

(22) Filed: Apr. 19, 2005

(65) Prior Publication Data

US 2005/0230096 A1    Oct. 20, 2005

(30) Foreign Application Priority Data

Apr. 19, 2004    (JP)    ............... 2004-123164

(51) Int. Cl.
*B60H 1/00*    (2006.01)
*F24F 7/007*    (2006.01)

(52) U.S. Cl. ............... 165/202; 165/42; 165/43; 165/54; 165/237; 454/75; 137/512.15; 137/852; 137/855

(58) Field of Classification Search ............... 165/202, 165/42, 43, 54, 237; 454/75, 162, 164; 137/512.15, 137/852, 855
See application file for complete search history.

(56) References Cited

U.S. PATENT DOCUMENTS 4,412,425 A * 11/1983 Fukami et al. ............... 454/161
4,989,499 A * 2/1991 Scoccia et al. ............... 454/70
5,261,856 A * 11/1993 Walser ............... 454/139
5,572,881 A    11/1996 Hotta et al.

FOREIGN PATENT DOCUMENTS

| DE | 4217394 A1 * | 12/1993 |
|---|---|---|
| JP | 09159208 A * | 6/1997 |
| JP | 2000062450 | 2/2000 |
| JP | 2000071751 A * | 3/2000 |
| JP | 2000289455 | 10/2000 |
| JP | 2002-200916 | 7/2002 |
| JP | 2002200916 | 7/2002 |

OTHER PUBLICATIONS

German Office Action, Application No. 10 205 018 043.4, dated Sep. 22, 2005.

* cited by examiner

*Primary Examiner*—John K Ford
(74) *Attorney, Agent, or Firm*—Lahive & Cockfield, LLP; Anthony A. Laurentano, Esq.

(57) ABSTRACT

A vehicle air-conditioning system includes an air-conditioner and an air outlet for opening and closing an opening formed in a rear part of a vehicle body. A control unit causes the air outlet to open and close the opening in accordance with changes in air conditions in a passenger compartment, so as to keep the passenger compartment environmentally good condition.

3 Claims, 10 Drawing Sheets

US 7,413,007 B2

VEHICLE AIR-CONDITIONING SYSTEM

FIELD OF THE INVENTION

The present invention relates to vehicle air-conditioning systems, and more particularly, to a vehicle air-conditioning system provided with a heat exchanger for the exchange of heat between inside air being discharged from within a passenger compartment and outside air being introduced into the passenger compartment.

BACKGROUND OF THE INVENTION

A vehicle air-conditioning system provided with a heat exchanger for the exchange of heat between inside air and outside air when the outside air is being introduced into a passenger compartment and the inside air is being discharged from within the passenger compartment is disclosed in Japanese Patent Laid-Open Publication No. 2002-200916, for example. This air-conditioning system will be described with reference to FIG. 10.

In an air-conditioning unit 100 shown in FIG. 10, a blower fan 101 is rotated and the opening and closing of first and second introduction doors 102, 103 is controlled, whereby outside air and inside air (hereinafter referred to as "introduced air") are delivered to the blower fan 101.

The introduced air is delivered to an evaporator 105 by the blower fan 101 so that the introduced air is cooled and dehumidified by the evaporator 105.

Part of the cooled and dehumidified introduced air is heated by a heater core 106 and delivered to a mixing chamber 107. The other part of the introduced air is directly delivered through an opening 108a of a mixing door 108 into the mixing chamber 107. The two flows of the introduced air are mixed in the mixing chamber 107 and adjusted to a desired temperature.

The introduced air adjusted to the desired temperature is discharged through, for example, a third passage 114 by opening, among first, second and third outlet doors 111, 112 and 113, the third outlet door 113, and through an outlet (not shown) into a passenger compartment.

The air-conditioning unit 100 is provided with an inside air discharge passage 118 which communicates with the passenger compartment, and an outside air introduction passage 119 upstream of the blower fan 101.

Inside air introduced from an inlet 118a of the inside air discharge passage 118 is delivered through a heat exchanger 120 to an outlet 118b of the inside air discharge passage 118.

The inside air passing through the outlet 118b of the inside air discharge passage 118 is discharged through a passage 122 formed in a door 121 and through an inside air discharge opening 122a to the outside.

When outside air introduced from an outside air inlet 119a is delivered through the heat exchanger 120 and through the outside air introduction passage 119 to the blower fan 101, the outside air exchanges heat with inside air delivered to the heat exchanger 120, being warmed by the heat of the inside air. Thus, the outside air is increased in temperature utilizing the heat of the inside air discharged from the passenger compartment, and the outside air having the increased temperature is delivered to the blower fan 101, resulting in an increased effect of heating.

However, a common vehicle is provided with an air outlet valve for discharging air in a lower area of a trunk for maintaining a desired internal pressure in a passenger compartment. As the air outlet valve, a louvered one is known, for example. When the internal pressure in the passenger compartment is not as high as a specified value, the air outlet valve keeps the louver closed by a spring force of an elastic member. When the internal pressure in the passenger compartment rises to the specified value, the internal pressure exceeds the spring force, opening the louver against the spring force of the elastic member. Inside air in the passenger compartment is discharged from the opening of the louver to the outside.

When inside air in the passenger compartment is discharged from the opening of the louver to the outside as described above, the heat of the inside air is released outside from the opening of the louver. The heat released outside from the opening of the louver cannot be utilized as heat for increasing the temperature of outside air introduced into the air-conditioning unit 100.

It is thus desired that an air-conditioning system allowing for an efficient exchange of heat between inside air discharged from within a passenger compartment and outside air introduced into an air-conditioning unit come into practical use.

SUMMARY OF THE INVENTION

According to an aspect of the present invention, there is provided a vehicle air-conditioning system which comprises: an outside air introduction passage for introducing outside air from outside a vehicle into a passenger compartment; an air-conditioner for heating or cooling the introduced outside air; an inside air discharge passage for discharging the air from the passenger compartment to outside the vehicle; a heat exchanger for the exchange of heat between inside air introduced into the inside air discharge passage and outside air introduced into the outside air introduction passage; an air outlet, separate from the inside air discharge passage, for enabling opening and closing of an opening provided for discharging inside air in the passenger compartment to the outside of the vehicle; and a controller for controlling the air outlet so as to keep the opening closed during the heat exchange.

In the present invention, part of the inside air in the passenger compartment to be discharged is all delivered into the inside air discharge passage, and the delivered inside air is discharged through the heat exchanger provided midway along the inside air discharge passage to the outside. In the heat exchanger, inside air being discharged from within the passenger compartment exchanges heat with outside air being introduced into the passenger compartment. When the internal pressure in the passenger compartment rises, the air outlet provided at the opening is controlled to adjust the degree of opening of the opening, so that the heat exchange with outside air can be efficiently performed to comfortably maintain vehicle interior environments.

Preferably, the controller controls the air outlet according to opening and closing of doors which constitute part of the passenger compartment. When a door is opened or closed, the internal pressure in the passenger compartment changes. The air outlet is controlled to absorb the change in the internal pressure. Specifically, when a door is opened, the internal pressure in the passenger compartment decreases. Against this, the air outlet is controlled to open the opening so as to desirably maintain the internal pressure. When the door is closed, the internal pressure in the passenger compartment temporarily rises. Against this, the opening is opened by the air outlet to desirably maintain the internal pressure, and then the air outlet is closed for good heat exchange.

Desirably, the controller preferably controls the air outlet to open the opening when an air pressure in the passenger compartment reaches a specified value. That is, when the inside air condition in the passenger compartment reaches the specified value, the controller controls the air outlet to open the opening, thereby restoring the inside air condition to the specified value. Here, the inside air condition may be carbon dioxide ($CO_2$) concentration or internal pressure, for example.

The air-conditioning system in the present invention preferably farther comprises an outside air flow rate regulator provided in the outside air introduction passage for regulating the amount of outside air introduction, the outside air flow rate regulator increasing the amount of outside air introduction into the outside air introduction passage when the opening is opened. Thus, it is possible to compensate for the amount of inside air discharged from the opening. The compensation for the amount of inside air discharged from the opening allows environmental conditions in the passenger compartment to be desirably maintained.

Also, the air-conditioning system in the present invention preferably further comprises an inside air flow rate regulator provided in the inside air discharge passage for regulating the amount of discharge of inside air discharged from within the passenger compartment. Thus, the inside air flow rate regulator ensures an amount of discharge of inside air from within the passenger compartment, and part of the inside air in the passenger compartment to be discharged can be discharged without being left in the passenger compartment.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
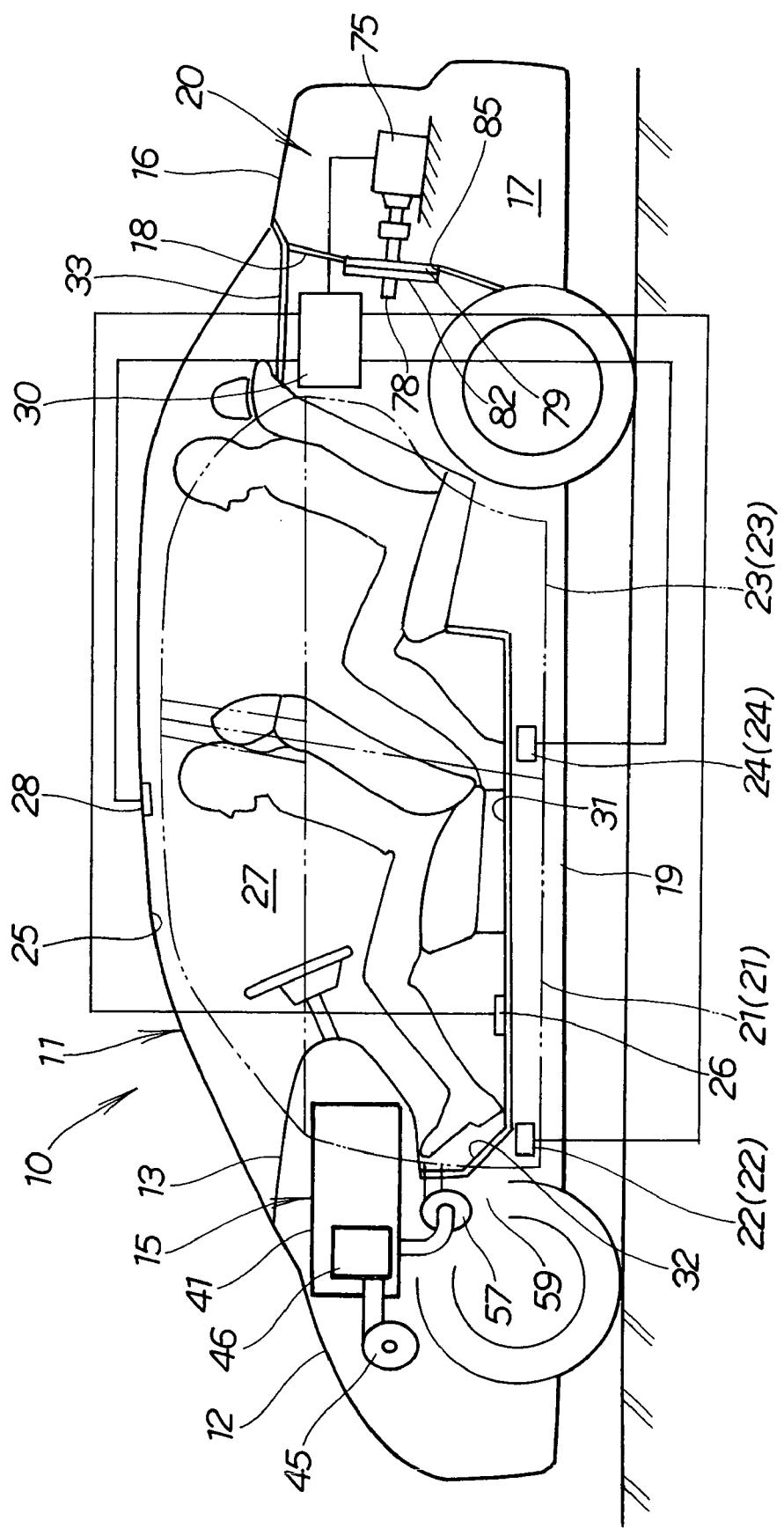
FIG. 1 is a schematic side view of a vehicle provided with a vehicle air-conditioning system according to the present invention.
Figure 2:
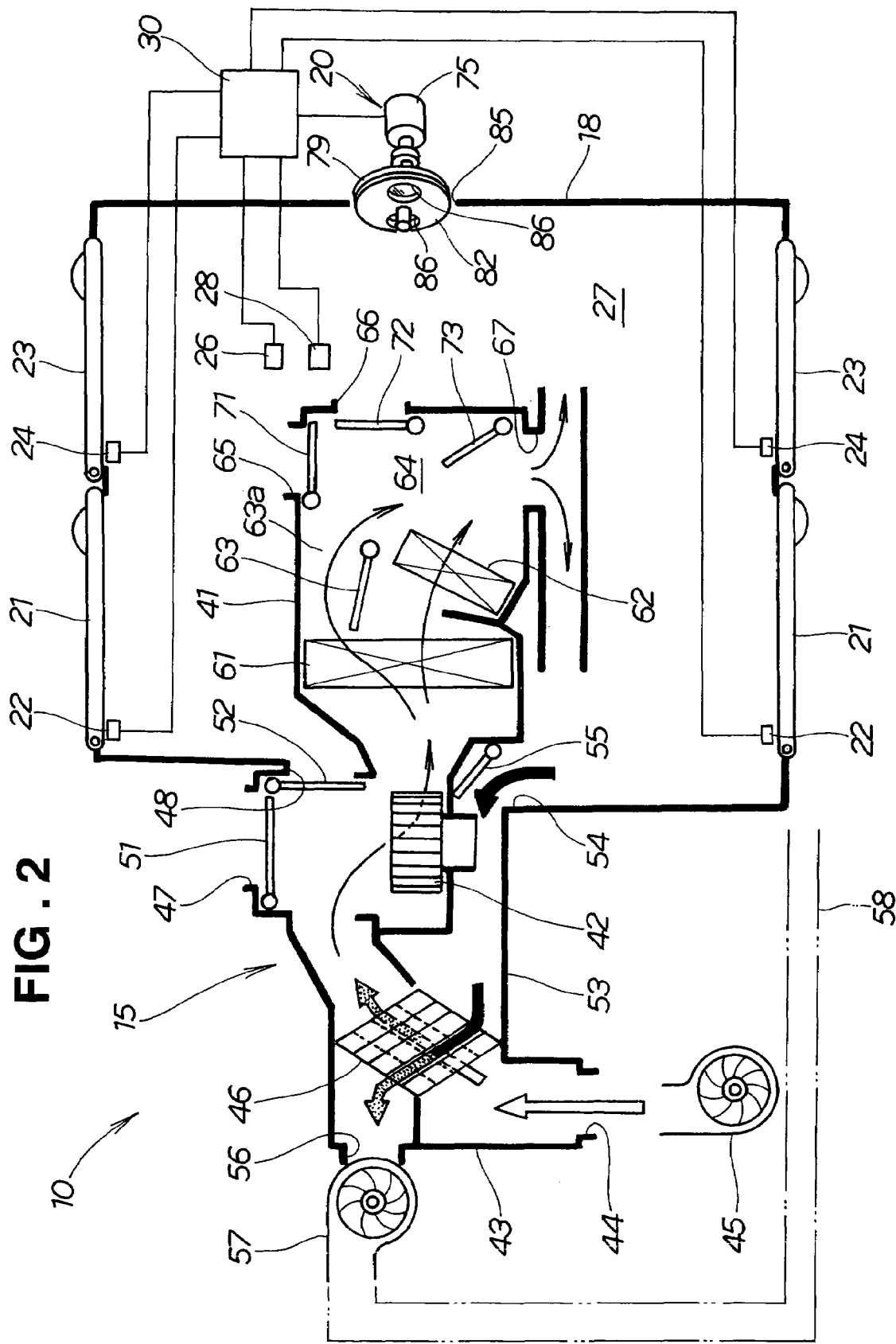
FIG. 2 is a schematic diagram illustrating the air-conditioning system shown in FIG. 1.

Referring to FIGS. 1 and 2, a vehicle air-conditioning system 10 according to the present invention is provided with an air-conditioning unit 15, an air outlet 20, front door opening and closing detection switches 22, 22, rear door opening and closing detection switches 24, 24, a concentration detection sensor 26, an internal pressure detection sensor 28, and a controller 30.

The air-conditioning unit 15 is provided in front of an instrument panel 13 in a front part 12 of a vehicle body 11. The air outlet 20 is provided at a bulkhead 18 of a trunk 17 in a rear part 16 of the vehicle body 11. The front door opening and closing detection switches 22, 22 are provided at a lower portion 19 of the vehicle body 11 to detect the opening and closing of right and left front side doors 21, 21, respectively. The rear door opening and closing detection switches 24, 24 are provided at the lower portion 19 of the vehicle body 11 to detect the opening and closing of right and left rear side doors 23, 23, respectively. The concentration detection sensor 26 is provided on a floor 31 which constitutes a floor face of the vehicle body 11, to detect carbon dioxide ($CO_2$) concentration. The internal pressure detection sensor 28 is provided at a roof 25 of the vehicle body 11 to detect the internal pressure in a passenger compartment 27. The controller 30 controls the air outlet 20 based on detection signals from the front and rear door opening and closing detection switches 22 and 24, the concentration detection sensor 26 and the internal pressure detection sensor 28.

In order to increase the airtightness of the passenger compartment 27, the airtightness of members forming the passenger compartment 27, such as the floor 31 of the vehicle body 11, a dashboard 32, a parcel shelf 33 which separates the passenger compartment 27 and the trunk 17, the instrument panel 13 and the roof 25, is increased.

The air-conditioning unit 15 includes a blower fan 42 provided substantially in the center of a casing 41, an outside air introduction passage 43 provided upstream of the blower fan 42, an outside air introduction fan (outside air flow rate regulator) 45 provided on the side of a first outside air inlet 44 of the outside air introduction passage 43, a heat exchanger 46 provided midway along the outside air introduction passage 43, a second outside air inlet 47 and an inside air inlet 48 provided near the blower fan 42 in the outside air introduction passage 43, an outside air introduction door 51 and an inside air introduction door 52 provided at the second outside air inlet 47 and the inside air inlet 48, respectively, an inside air discharge passage 53 provided next to the outside air introduction passage 43, an inside air inlet 54 of the inside air discharge passage 53 provided near the blower fan 42, an inside air discharge door 55 provided at the inside air inlet 54, the heat exchanger 46 provided midway along the inside air discharge passage 53, and an inside air discharge fan (inside air flow rate regulator) 57 provided on the side of an inside air outlet 56 of the inside air discharge passage 53.

As shown in FIG. 2, the outside air introduction door 51 is a door for switching between a state in which outside air is introduced from the first outside air inlet 44 into the outside air introduction passage 43 by closing the second outside air inlet 47 and opening the outside air introduction passage 43, and a state in which outside air is introduced from the second outside air inlet 47 by opening the second outside air inlet 47 and closing the outside air introduction passage 43.

The inside air introduction door 52 is a door for switching between a state in which inside air is not introduced to the blower fan 42 by closing the inside air inlet 48, and a state in which inside air is introduced to the blower fan 42 by opening the inside air inlet 48.

The inside air discharge door 55 is a door for switching between a state in which inside air is introduced into the inside air discharge passage 53 by opening the inside air inlet 54, and a state in which inside air is not introduced into the inside air discharge passage 53 by closing the inside air inlet 54.

The outside air introduction fan 45 is a fan for delivering outside air through the first outside air inlet 44 of the outside air introduction passage 43 to the heat exchanger 46.

The inside air discharge fan 57 is a fan for delivering inside air through the inside air outlet 56 of the inside air discharge passage 53 to the outside.

An outlet 58 communicating with the inside air discharge fan 57 is opposed to a portion under low air resistance of the vehicle body 11 (see FIG. 1), that is, a portion under low pressure when the vehicle is running. Since the outlet 58 communicating with the inside air discharge fan 57 is opposed to the portion under low pressure, inside air can be efficiently discharged from the outlet 58. A right front fender 59 (see FIG. 1), for example, corresponds to the portion under lower pressure.

The heat exchanger 46 includes a first passage (not shown) through which inside air introduced from the inside air inlet 54 of the inside air discharge passage 53 passes toward the inside air outlet 56 of the inside air discharge passage 53, and a second passage (not shown) through which outside air introduced from the first outside air inlet 44 of the outside air introduction passage 43 passes toward the blower fan 42. The heat exchanger 46 allows inside air to pass through the first passage of the heat exchanger 46 and allows outside air to pass through the second passage of the heat exchanger 46, for the exchange of heat between the inside air flowing through the inside air discharge passage 53 and the outside air flowing through the outside air introduction passage 43.

The air-conditioning unit 15 also includes an evaporator 61 and a heater core 62 provided downstream of the blower fan 42 in this order, a mixing door 63 provided downstream of the evaporator 61, and a mixing chamber 64 provided downstream of the mixing door 63 and the heater core 62.

First, second and third passages 65, 66 and 67 are provided down-stream of the mixing chamber 64, and first, second and third outlet doors 71, 72 and 73 are provided in these passages 65, 66 and 67, respectively. Outlets of the three passages 65, 66 and 67 communicate with respective air outlets (not shown).

In the air-conditioning unit 15, when heating the interior of the passenger compartment 27, for example, the blower fan 42 is rotated and the outside air introduction door 51 and the inside air introduction door 52 are opened or closed so that outside air and inside air (hereinafter referred to as "introduced air") are delivered from the first or second outside air inlets 44 or 47 and the inside air inlet 48 to the blower fan 42.

The introduced air is delivered to the evaporator 61 by the blower fan 42 so that the introduced air is cooled and dehumidified by the evaporator 61.

Part of the cooled and dehumidified introduced air is heated by the heater core 62 and delivered to the mixing chamber 64, while the other part of the introduced air is delivered through an opening 63a of the mixing door 63 to the mixing chamber 64. The two flows of the introduced air are mixed in the mixing chamber 64 and adjusted to a desired temperature.

The introduced air adjusted to the desired temperature is controlled by the first, second and third outlet doors 71, 72 and 73 to be discharged through the third passage 67, for example, and the air outlet (not shown) into the passenger compartment 27.

Since the air-conditioning unit 15 includes the heat exchanger 46 provided midway along the outside air introduction passage 43 and along the inside air discharge passage 53, inside air flowing through the inside air discharge passage 53 and outside air flowing through the outside air introduction passage 43 can exchange heat.

More specifically, when the interior of the passenger compartment 27 is heated, for example, the inside air in the passenger compartment 27 is higher in temperature than the outside air. Thus, by letting outside air and inside air pass through the heat exchanger 46, the heat of the inside air can be transferred to the outside air introduced through the heat exchanger 46, increasing the temperature of the outside air. With this, the heat of inside air discharged from the passenger compartment 27 can be utilized to increase the temperature of outside air to deliver the outside air increased in temperature to the blower fan 42. This results in an increase in the heating effect of the air-conditioning unit 15.

On the other hand, when the interior of the passenger compartment 27 is cooled, for example, the inside air is lower in temperature than the outside air. Thus, by letting outside air and inside air pass through the heat exchanger 46, the outside air introduced through the heat exchanger 46 can be cooled by the cooled inside air. With this, inside air discharged from the passenger compartment 27 can be utilized to cool outside air to deliver the cooled outside air to the blower fan 42. This results in an increase in the cooling effect of the air-conditioning unit 15.

In the front part 12 (see FIG. 1) of the vehicle body 11, the right and left front side doors 21, 21 are provided. The right and left rear side doors 23, 23 are provided rearward of the right and left front side doors 21, 21.

Near the right and left front side doors 21, 21, the front door opening and closing detection switches 22, 22 for detecting the opening and closing of the respective doors 21, 21 are provided. Also, near the right and left rear side doors 23, 23, the rear door opening and closing detection switches 24, 24 for detecting the opening and closing of the respective doors 23, 23 are provided.

The front and rear door opening and closing detection switches 22 and 24 operate in the same way. Hereinafter, as an example, the front door opening and closing detection switch 22 provided near the right front side door 21 will be described, and the other door detection switches 22 and 24 will not be described.

The front door opening and closing detection switch 22 is a switch which is turned on when the right front side door 21 starts to open from a fully-closed state, and is turned off when the right front side door 21 starts to close from a fully-open state, for example.

The concentration detection sensor 26 for detecting carbon dioxide ($CO_2$) concentration (hereinafter referred to as "$CO_2$ concentration") is provided on the floor 31 (see FIG. 1) of the vehicle body 11.

The concentration detection sensor 26 operates when the $CO_2$ concentration (Dm) in the passenger compartment 27 exceeds a specified value (Dr).

The internal pressure detection sensor 28 for detecting the internal pressure in the passenger compartment 27 is provided near the concentration detection sensor 26. The internal pressure detection sensor 28 is a sensor which detects an excess of the internal pressure (Pm) in the passenger compartment 27 over a specified value (Pr) when the internal pressure (Pm) exceeds the specified value (Pr).

The air outlet 20 is provided at the bulkhead 18 of the trunk 17 (see FIG. 1) in the rear part 16 of the vehicle body 11. The air outlet 20 will be described with reference to FIGS. 3A and 3B.

Figure 3A:
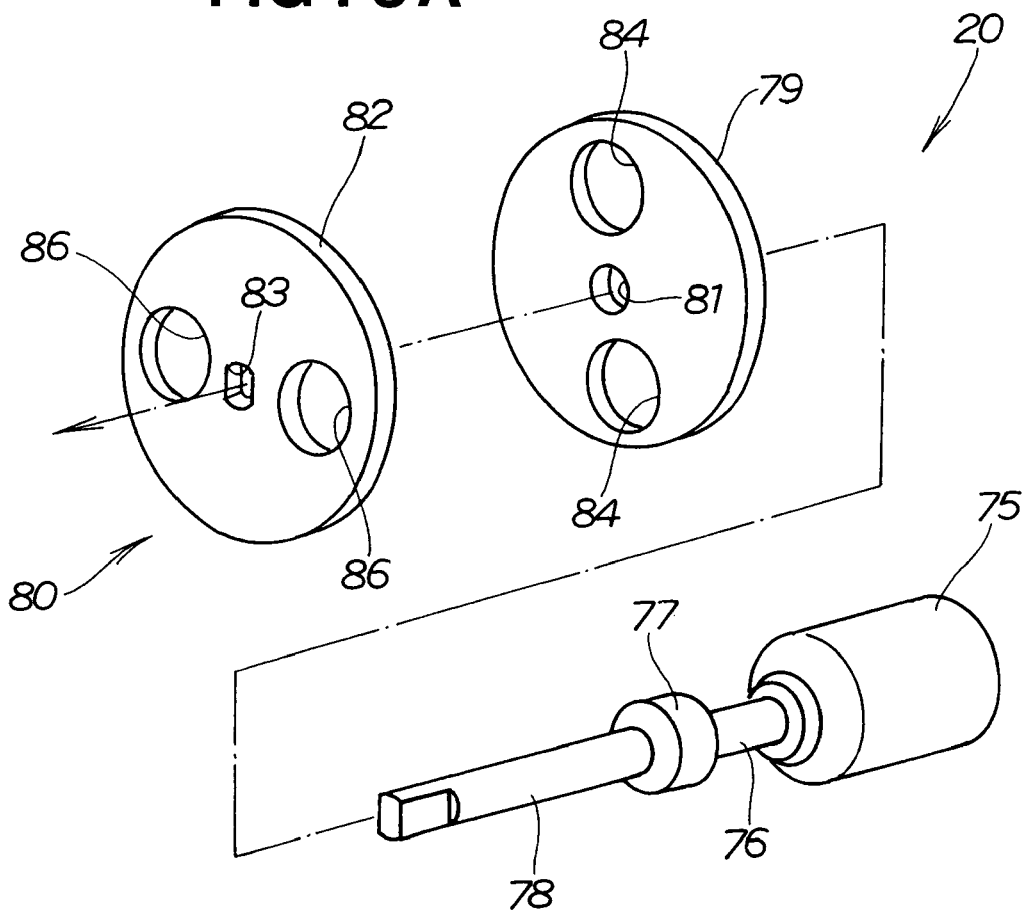
FIGS. 3A and 3B are diagrams illustrating an air outlet shown in FIG. 2.
Figure 3B:
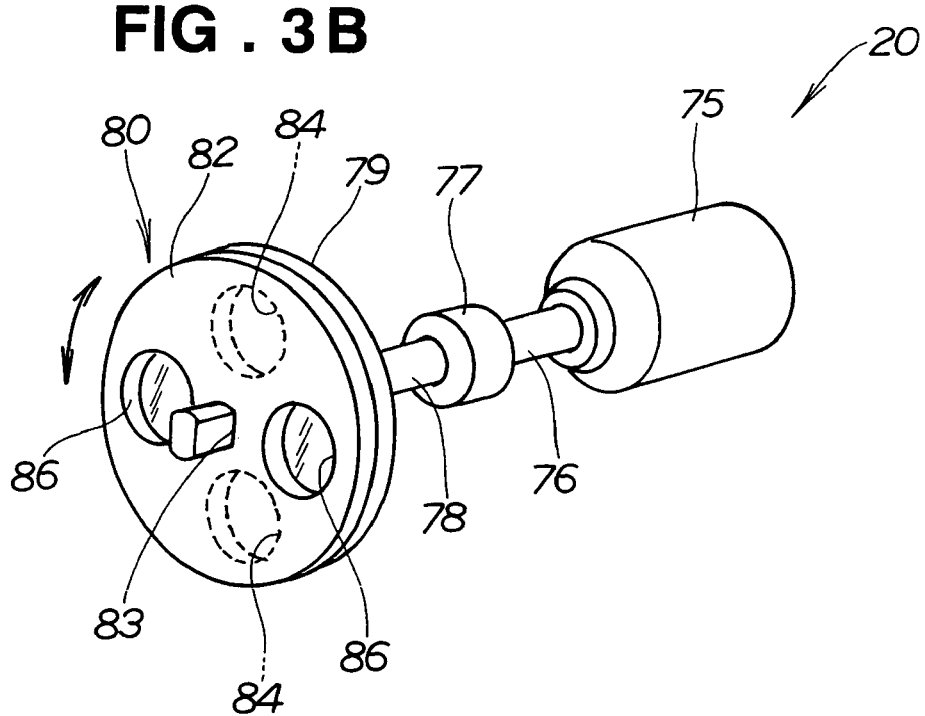

Referring to FIGS. 3A and 3B, the air outlet 20 includes a drive motor 75 provided at the vehicle body 11 (see FIG. 1), and an air outlet valve 80 connected to a drive shaft 76 of the drive motor 75 via a connecting portion 77.

The air outlet valve 80 includes a rotary shaft 78 connected to the drive shaft 76 via the connecting portion 77, a fixed plate 79 including a fitting hole 81 into which the rotary shaft 78 is fitted, and a rotary plate 82 including a mounting hole 83 in which the rotary shaft 78 is engaged.

The fixed plate 79 is a circular plate rotatably mounted on the rotary shaft 78, and is formed with a pair of openings 84, 84 at symmetrical positions with respect to the fitting hole 81. The fixed plate 79 is mounted to an opening 85 (see FIGS. 1 and 2).

The rotary plate 82 is also a circular plate of the same size as that of the fixed plate 82, mounted on the rotary shaft 78 rotatably with the rotary shaft 78, and is formed with a pair of openings 86, 86 at symmetrical positions with respect to the mounting hole 83.

The air outlet valve 80 can close the opening 85 shown in FIGS. 1 and 2 by arranging the openings 84 and 86 in the fixed plate 79 and the rotary plate 82 alternately 90° apart.

With the openings 84, 84 in the fixed plate 79 and the openings 86, 86 in the rotary plate 82 arranged 90° apart, the drive motor 75 is rotated to rotate the rotary plate 82 through the rotary shaft 78. With this, the openings 84, 84 in the fixed plate 79 and the openings 86, 86 in the rotary plate 82 can be aligned, fully opening passages 87, 87 (see FIG. 6B), and thus opening the opening 85 shown in FIGS. 1 and 2.

The controller 30 shown in FIG. 2 controls the drive motor 75 of the air outlet 20 based on an on/off signal from the front door opening and closing detection switch 22.

Also, the controller 30 controls the drive motor 75 of the air outlet 20 based on a detection signal from the concentration detection sensor 26 when the $CO_2$ concentration (Dm) exceeds the specified value (Dr).

Also, the controller 30 controls the drive motor 75 of the air outlet 20 based on a detection signal from the internal pressure detection sensor 28 when the internal pressure (Pm) exceeds the specified value (Pr).

Figure 4:
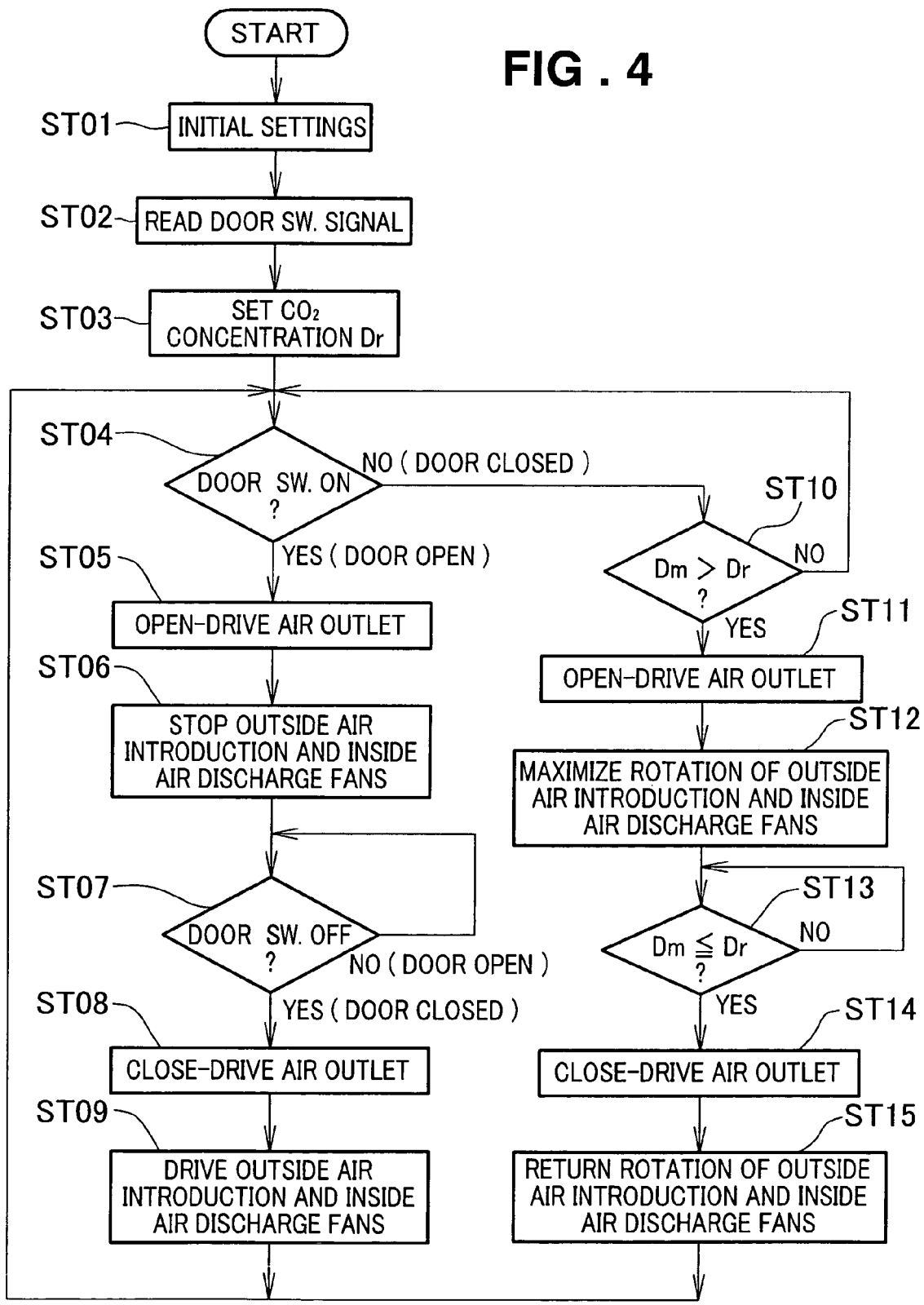
FIG. 4 is a flowchart in a control unit shown in FIG. 2.

Next, the control of the air-conditioning system 10 will be descried with reference to a flowchart shown in FIG. 4, and also to FIG. 2.

Step (hereinafter abbreviated as ST) 01: Initial settings are performed. For example, the right front side door 21 is set closed; the air-conditioning unit 15 on; the outside air introduction fan 45 at medium speed; the inside air discharge fan 57 at medium speed; and the air outlet closed (that is, the opening 85 closed), for example.

ST02: A switch signal from the front door opening and closing detection switch (SW.) 22 is read as an input signal.

ST03: The specified value (Dr) of the "$CO_2$ concentration" in the passenger compartment 27 is set.

ST04: It is determined whether or not the front door opening and closing detection switch 22 is on. When the front door opening and closing detection switch 22 is on, the process proceeds to ST05, and when off, proceeds to ST10. When the front door opening and closing detection switch 22 is on, the right front side door 21 is opened. When the front door opening and closing detection switch 22 is off, the right front side door 21 is closed.

ST05: The air outlet 20 is driven (controlled) to open. With this, the opening 85 is kept open.

ST06: Introduction and discharge fans 45 and 57 are stopped.

ST07: It is determined whether or not the front door opening and closing detection switch 22 is off. When the front door opening and closing detection switch 22 is off, the process proceeds to ST08, and when not, the determination is repeated in ST07 until the front door opening and closing detection switch 22 is turned off.

ST08: The air outlet 20 is driven to close, and the opening 85 is kept closed.

ST09: The introduction and discharge fans 45 and 57 are driven, and then the process returns to ST04.

ST10: When it is determined that the front door opening and closing detection switch 22 is off in ST04, the "$CO_2$ concentration" Dm in the passenger compartment 27 is compared with the specified value Dr to determine whether Dm>Dr or not. When Dm>Dr, the process proceeds to ST11, and when not, returns to ST04.

ST11: The air outlet 20 is driven to open, and the opening 85 is kept open.

ST12: Rotation of the introduction and discharge fans 45 and 57 is increased to the maximum.

ST13: The "$CO_2$ concentration" Dm in the passenger compartment 27 is compared with the specified value Dr to determine whether Dm≦Dr or not. When Dm≦Dr, the process proceeds to ST14, and when not, the determination is repeated in ST13 until Dm ≦Dr.

ST14: The air outlet 20 is driven to close, and the opening 85 is kept closed.

ST15: Rotation of the introduction and discharge fans 45 and 57 is returned to the middle speed, and then the process returns to ST04.

This control is terminated by turning off a main switch (not shown) of the air-conditioning unit 15.

Next, the steps illustrated in FIG. 4 will be described in detail with reference to FIGS. 5A through 9.

Figure 5A:
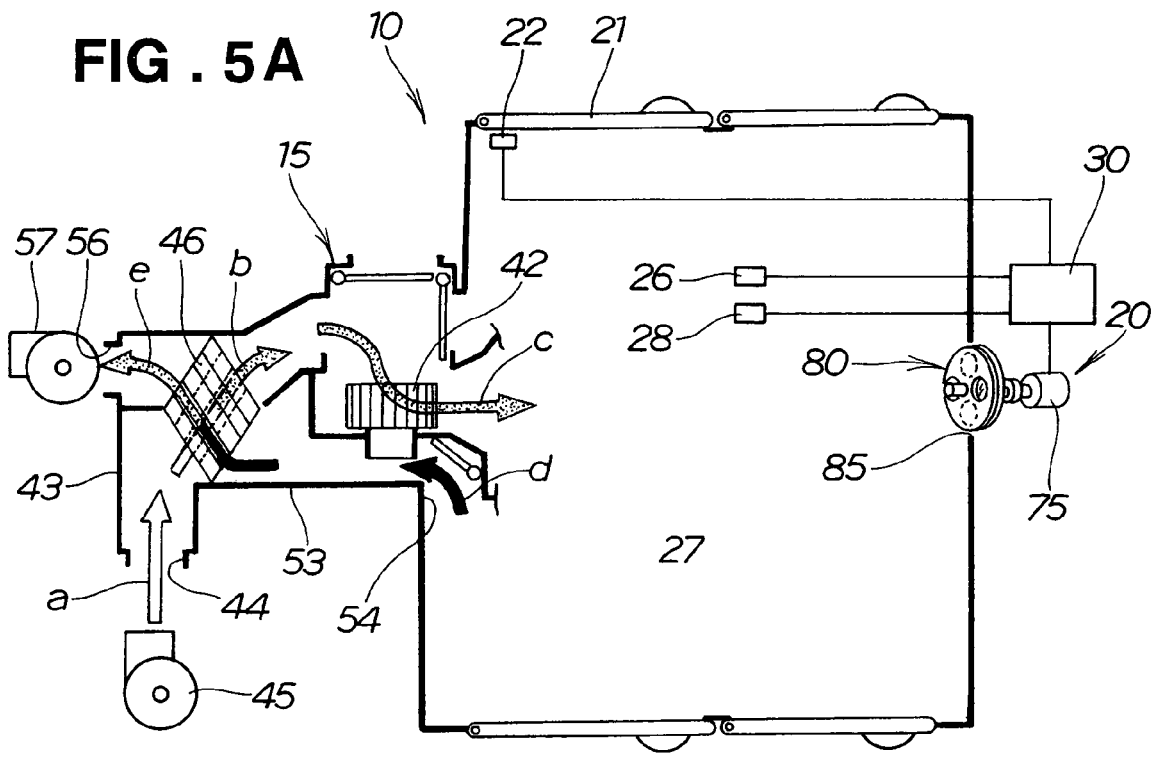
FIGS. 5A and 5B are diagrams illustrating a situation in which a right front side door is opened when the air-conditioning system shown in FIG. 2 is being used.
Figure 5B:
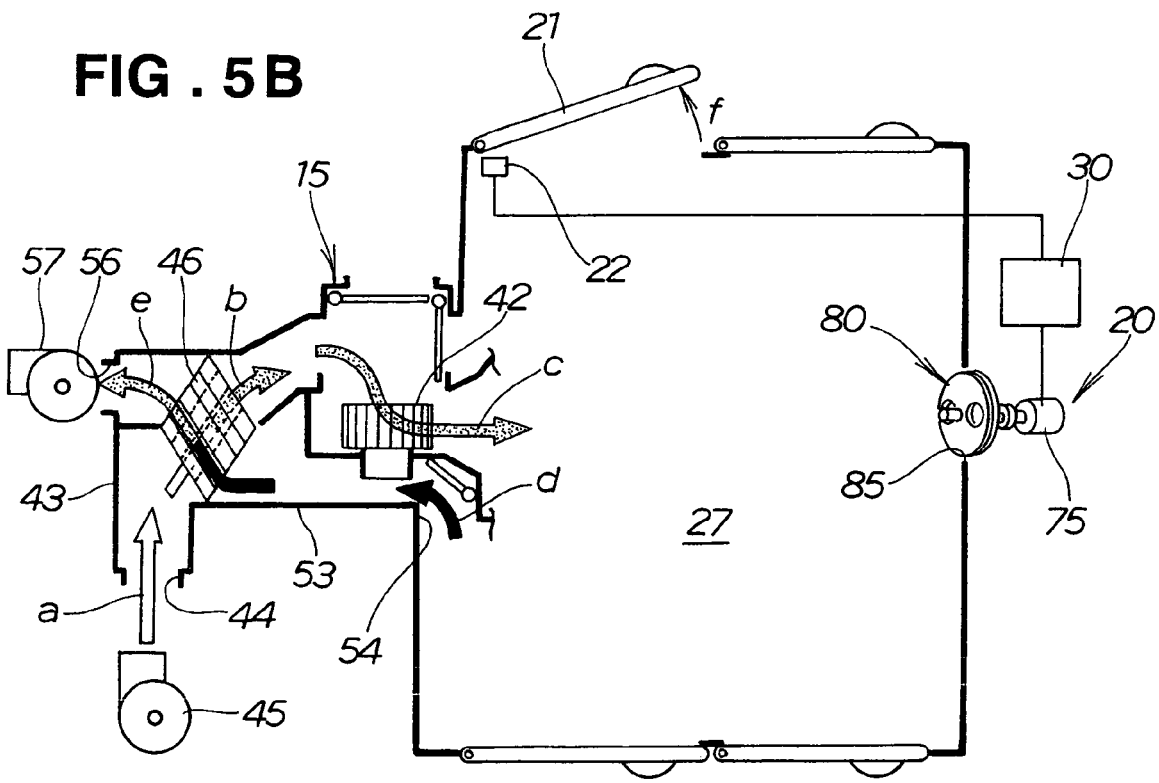

FIGS. 5A and 5B illustrate the air-conditioning system 10 being used with the right front side door 21 closed, and the operation of the air-conditioning system 10 when the right front side door 21 is opened, which corresponds to ST04 shown in FIG. 4.

FIG. 5A illustrates a situation in which the right front side door 21 is closed and the air outlet 20 is closed (that is, the opening 85 is closed). With this, the airtightness of the passenger compartment 27 is kept high, and the passenger compartment 27 communicates with the outside only through the inside air discharge passage 53.

In this state, the air-conditioning unit 15, the outside air introduction fan 45, and the inside air discharge fan 57 are controlled. Specifically, the air-conditioning unit 15 is set in a heating state; the rotation of the outside air introduction fan 45 at middle speed; and the rotation of the inside air discharge fan 57 at middle speed. With this state, the inside air in the passenger compartment 27 is kept high in temperature.

By rotating the outside air introduction fan 45 at middle speed, outside air is introduced from the first outside air inlet 44 into the outside air introduction passage 43 as shown by arrow a. The outside air introduced into the outside air introduction passage 43 is efficiently delivered through the heat exchanger 46 to the blower fan 42 as shown by arrow b.

This outside air is delivered by the blower fan 42 to the evaporator 61 and the heater core 62 shown in FIG. 2 as shown by arrow c. By letting the outside air pass through the evaporator 61 and the heater core 62, the outside air dehumidified and increased to a desired temperature is discharged into the passenger compartment 27.

The discharge of the outside air increased to the desired temperature into the passenger compartment 27 increases the internal pressure in the passenger compartment 27. Therefore, it is necessary to discharge inside air from the passenger compartment to desirably maintain the internal pressure in the passenger compartment 27.

For this, the inside air discharge fan 57 is rotated at middle speed so that part of the inside air in the passenger compartment 27 to be discharged is efficiently drawn from the inside air inlet 54 into the inside air discharge passage 53 as shown by arrow d.

The inside air drawn into the inside air discharge passage 53 is delivered through the heat exchanger 46 and the inside air outlet 56 to the outlet 58 (see FIG. 2) as shown by arrow e, and is discharged outside from the outlet 58.

The inside air discharge fan 57 is provided in the inside air discharge passage 53 so that part of the inside air in the passenger compartment 57 to be discharged is discharged without being left in the passenger compartment 27. With this, the inside air in the passenger compartment 27 can be kept in desirable conditions.

Inside air discharged from the passenger compartment 27 is all discharged through the heat exchanger 46 to the outside, and outside air introduced into the outside air introduction passage 43 passes through the heat exchanger 46. The heat of the inside air is transferred to the outside air introduced through the heat exchanger 46, increasing the temperature of the outside air. Thus, the heat of inside air discharged from the passenger compartment 27 can be utilized to increase the temperature of outside air and deliver the increased-temperature outside air to the blower fan 42. This results in an increase in the heat exchangeability of the heat exchanger 46 and an increase in the heating effect of the air-conditioning unit 15.

Also, when cooling the passenger compartment 27, the exchange of heat between inside air and outside air can be increased as in the case of heating the passenger compartment 27.

Referring to FIG. 5B, when the right front side door 21 constituting part of the passenger compartment 27 is opened as shown by arrow f, turning on the front door opening and closing detection switch 22, the on signal is transmitted to the controller 30. Based on the on signal, the controller 30 controls the rotation of the drive motor 75 of the air outlet 20 to open the air outlet valve 80.

Figure 6A:
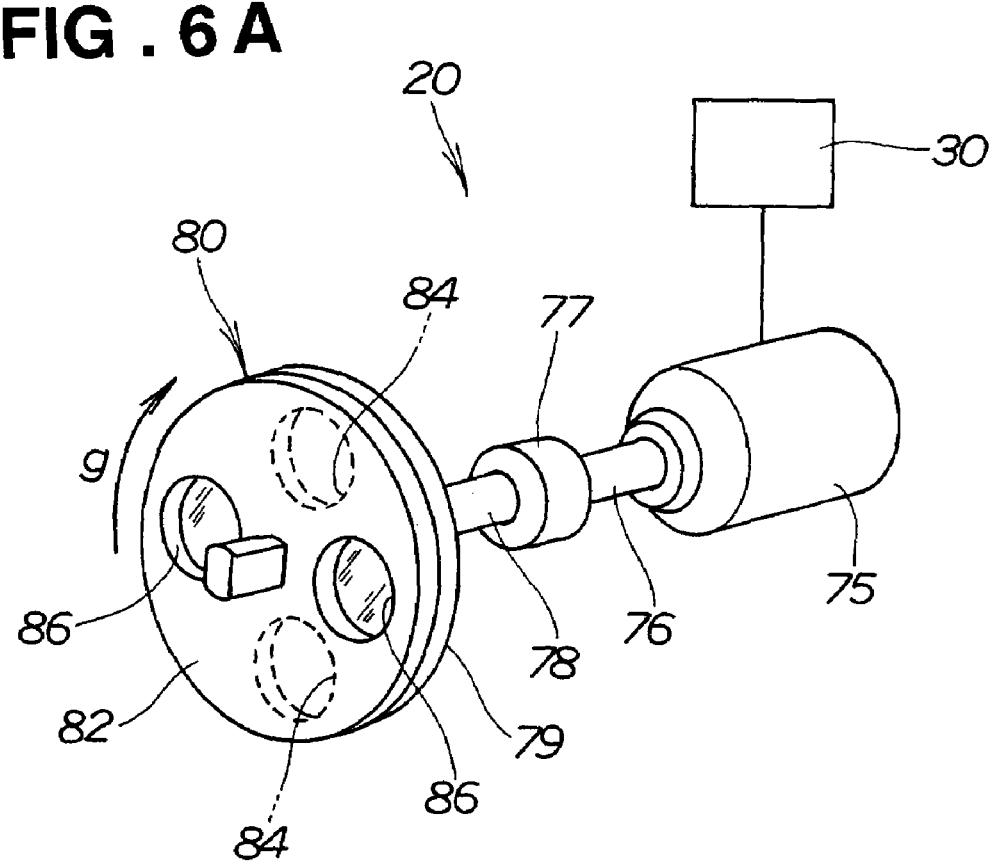
FIGS. 6A and 6B are diagrams illustrating how an air outlet valve is opened.
Figure 6B:
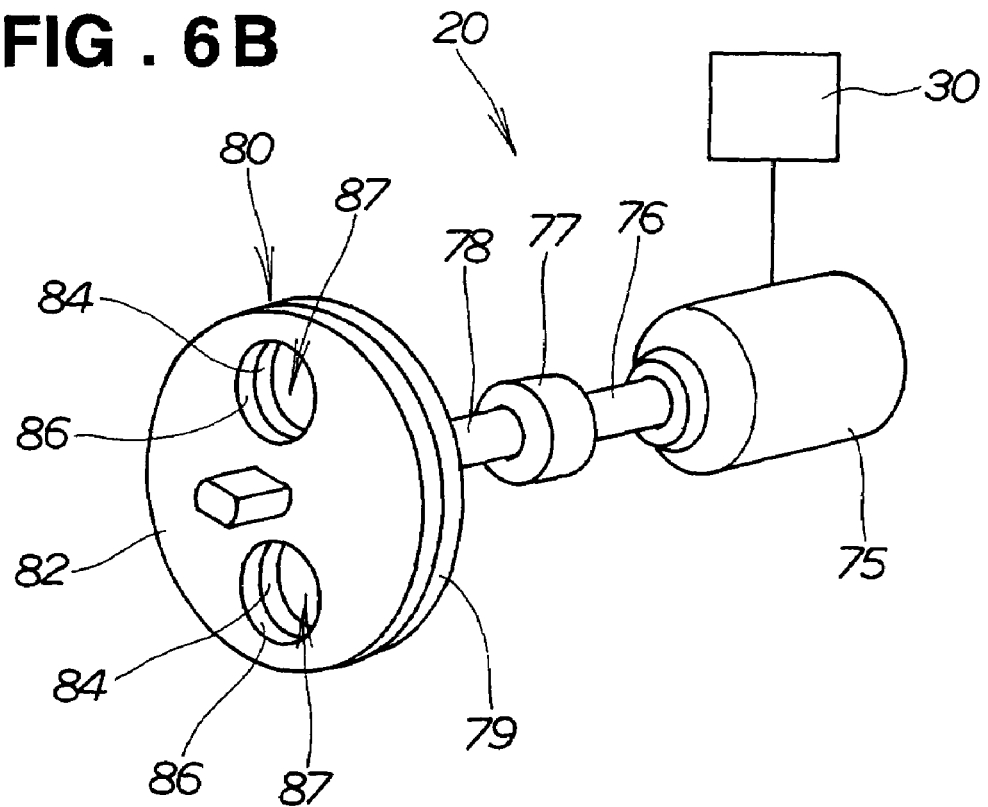

FIGS. 6A and 6B illustrate the air outlet valve 80 switching from the closed state to the open state, which corresponds to ST05 in FIG. 4.

Referring to FIG. 6A, the openings 86, 86 in the rotary plate 82 are arranged 90° apart from the openings 84, 84 in the fixed plate 79, and the air outlet valve 80 is kept closed.

The controller 30 controls the drive motor 75 of the air outlet 20 for normal rotation, based on an open-drive signal.

Normal rotation of the drive shaft 76 causes the rotary shaft 78 to normally rotate via the connecting portion 77, and the rotary plate 82 normally rotates in a clockwise direction as shown by arrow g.

Referring to FIG. 6B, the rotary plate 82 normally rotates 90°, and the openings 86, 86 in the rotary plate 82 align with the openings 84, 84 in the fixed plate 79. With this, the passages 87, 87 in the air outlet valve 80 are fully opened, opening the opening 85 (see FIG. 7A).

After the rotary plate 82 rotates 90°, the controller 30 controls the rotation of the drive motor 75 to stop based on a stop signal.

In this manner, when the right front side door 21 shown in FIG. 5B is opened, the passages 87, 87 in the air outlet valve 80 are fully opened to open the opening 85 so as to introduce outside air from the opening 85 into the passenger compartment 27.

Therefore, even when a relatively large amount of inside air is instantly discharged through a space formed by opening the right front side door 21, outside air is introduced from the opening 85 into the passenger compartment 27, so that the internal pressure in the passenger compartment 27 can be desirably maintained.

Figure 7A:
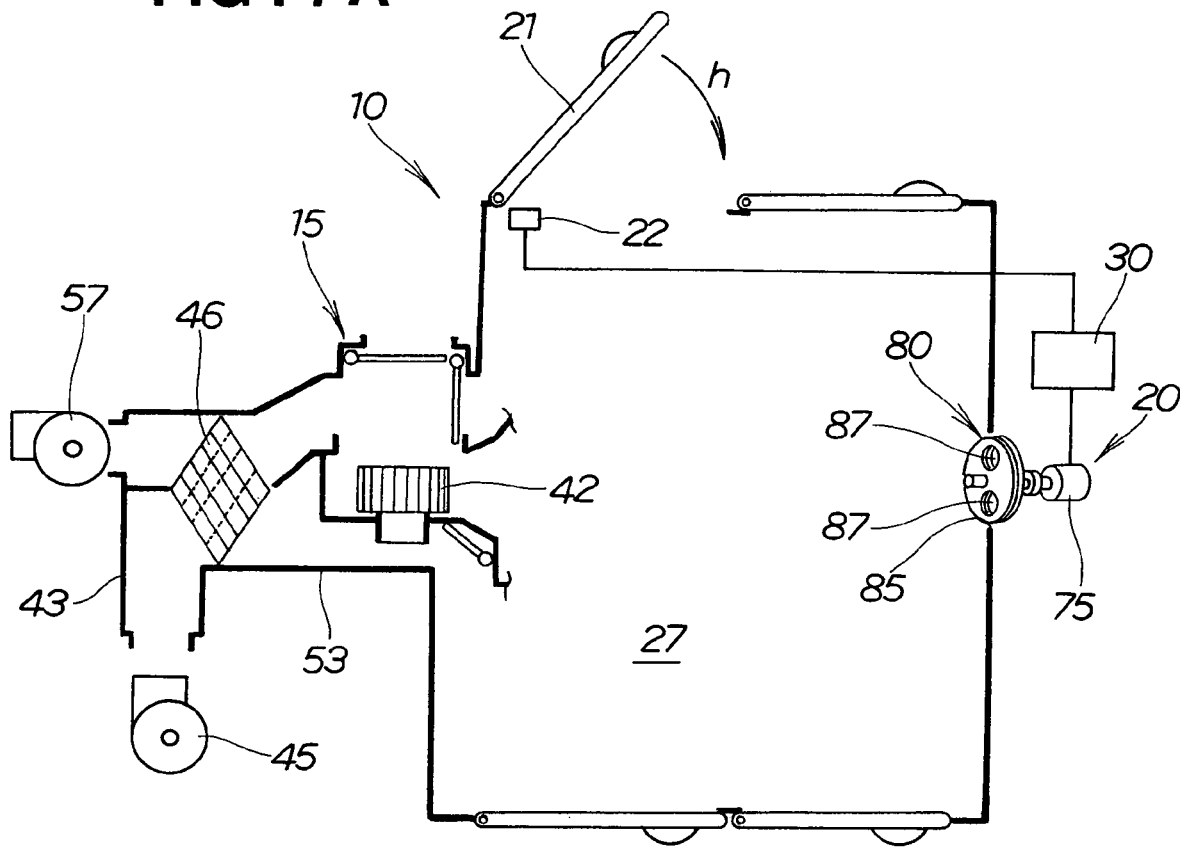
FIGS. 7A and 7B are diagrams illustrating a situation in which the right front side door is closed when the air-conditioning system is being used.
Figure 7B:
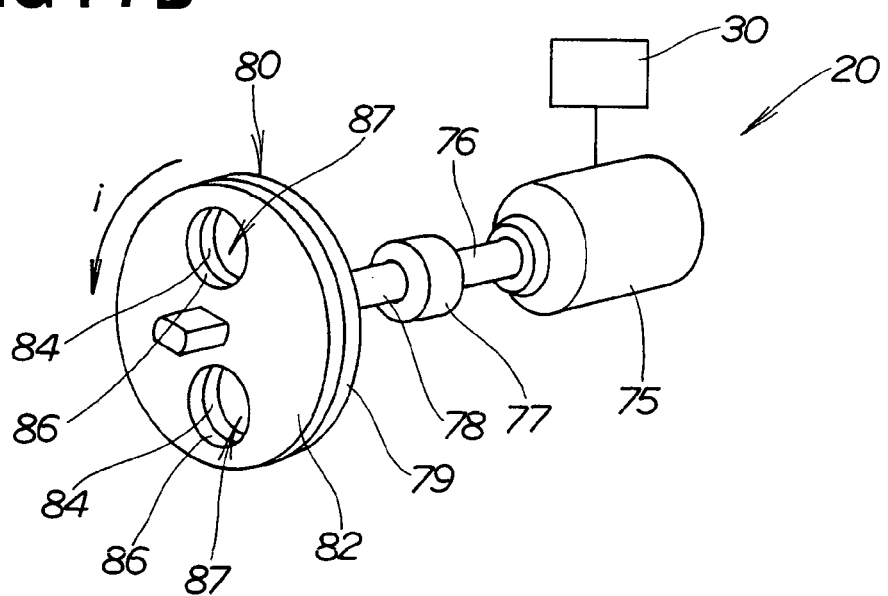

FIGS. 7A and 7B illustrate a situation in which the right front side door 21 is opened when the air-conditioning system 10 is being used, and the operation when the door 21 is then closed. These figures correspond to ST06, ST07 and ST08 in FIG. 4.

Referring to FIG. 7A, after the passages 87, 87 in the air outlet valve 80 are fully opened, the outside air introduction fan 45 is stopped, and simultaneously the inside air discharge fan 57 is stopped.

Hereinafter, an example in which the right front side door 21 is closed will be described.

The right front side door 21 is closed as shown by arrow h, turning off the front door opening and closing detection switch 22. The controller 30 receives an off signal from the front door opening and closing detection switch 22.

The controller 30 outputs a close-drive signal based on the off signal. Based on the close-drive signal, the drive motor 75 of the air outlet 20 rotation-drives the air outlet valve 80 to close.

Referring to FIG. 7B, the openings 84, 84 in the fixed plate 79 are aligned with the openings 86, 86 in the rotary plate 82, and the air outlet valve 80 is kept open.

The drive motor 75 of the air outlet 20 rotates reversely based on the close-drive signal supplied from the controller 30.

The reverse rotation of the drive shaft 76 of the drive motor 75 causes the rotary shaft 78 to reversely rotate via the connecting portion 77, and the rotary plate 82 reversely rotates in a counterclockwise direction as shown by arrow i.

Figure 8A:
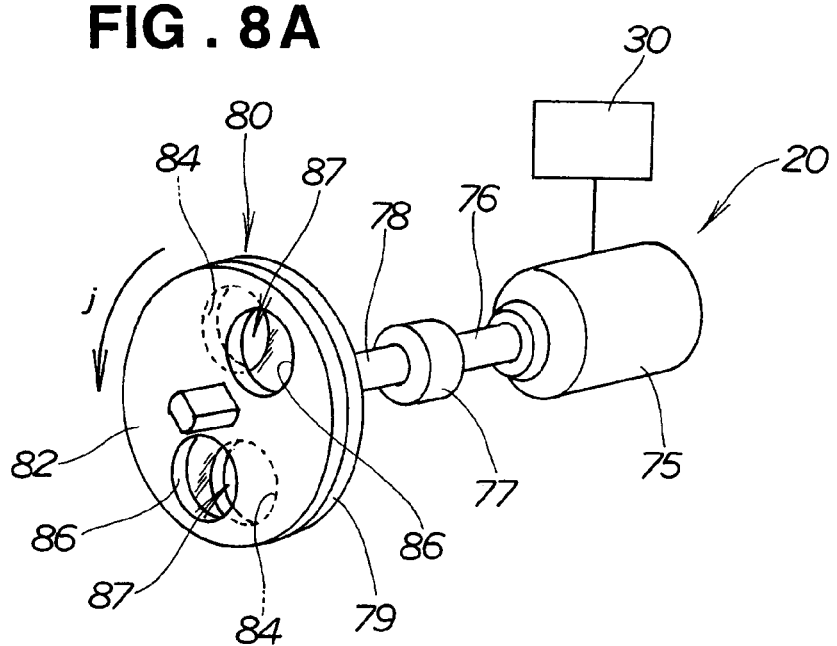
FIGS. 8A and 8B are diagrams illustrating a situation in which the right front side door is halfway closed when the air-conditioning system is being used.
Figure 8B:
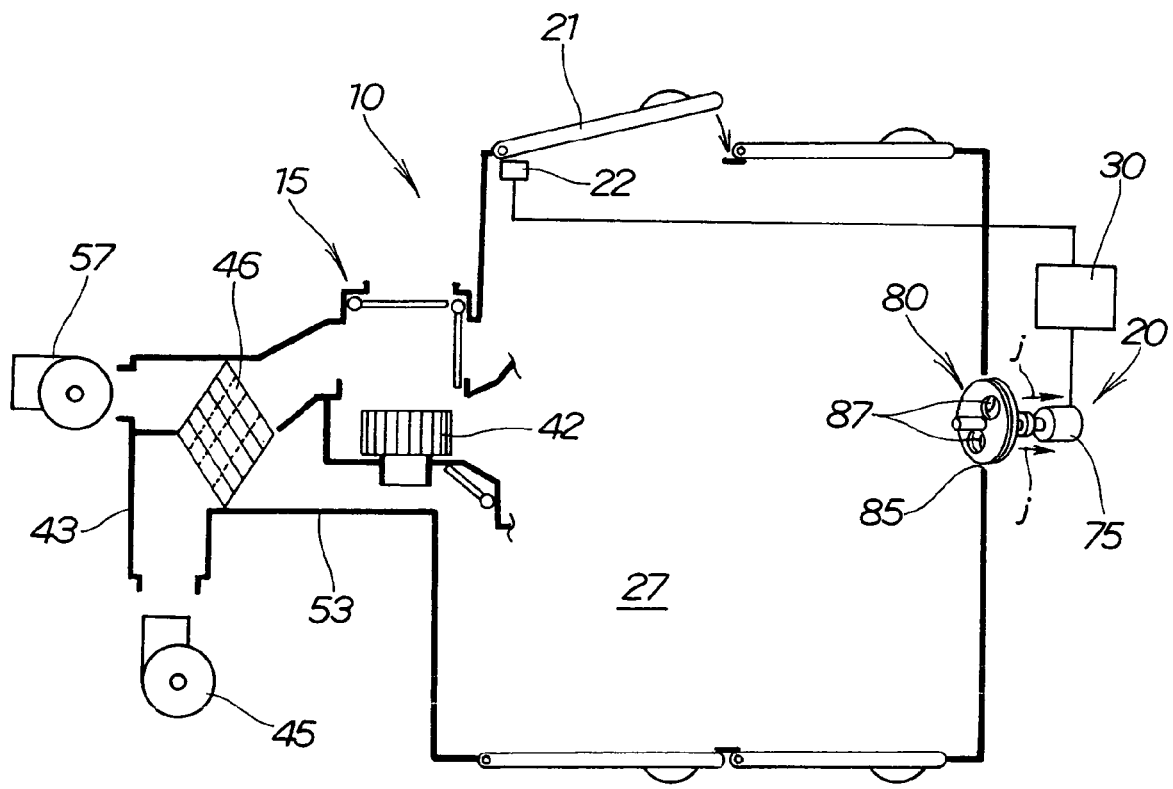

FIGS. 8A and 8B illustrate a situation in which the right front side door 21 is closed halfway when the air-conditioning system 10 is being used.

When the right front side door 21 shown in FIG. 7A is closed, it is desirable to increase the internal pressure in the passenger compartment 27 to a certain degree so that the closing speed of the right front side door 21 is desirably reduced by the internal pressure and the right front side door 21 is comfortably closed.

For this, when the right front side door 21 is closed, the air outlet 20 is controlled by the controller 30 to make the opening of the opening 85 (see FIG. 7A) small as shown in FIG. 8A. That is, the openings 86, 86 in the rotary plate 82 are slightly overlapped with the openings 84, 84 in the fixed plate 79. With this, the passages 87, 87 in the air outlet valve 80 are made small.

Referring to FIG. 8B, when the right front side door 21 is closed, a small amount of inside air is discharged from the opening 85 through the small passages 87, 87 in the air outlet valve 80 as shown by arrows j. With this, the internal pressure in the passenger compartment 27 can be desirably maintained.

In addition, the desirably maintained internal pressure in the passenger compartment 27 can favorably reduce the closing speed of the right front side door 21 to close the right front side door 21 comfortably.

Figure 9:
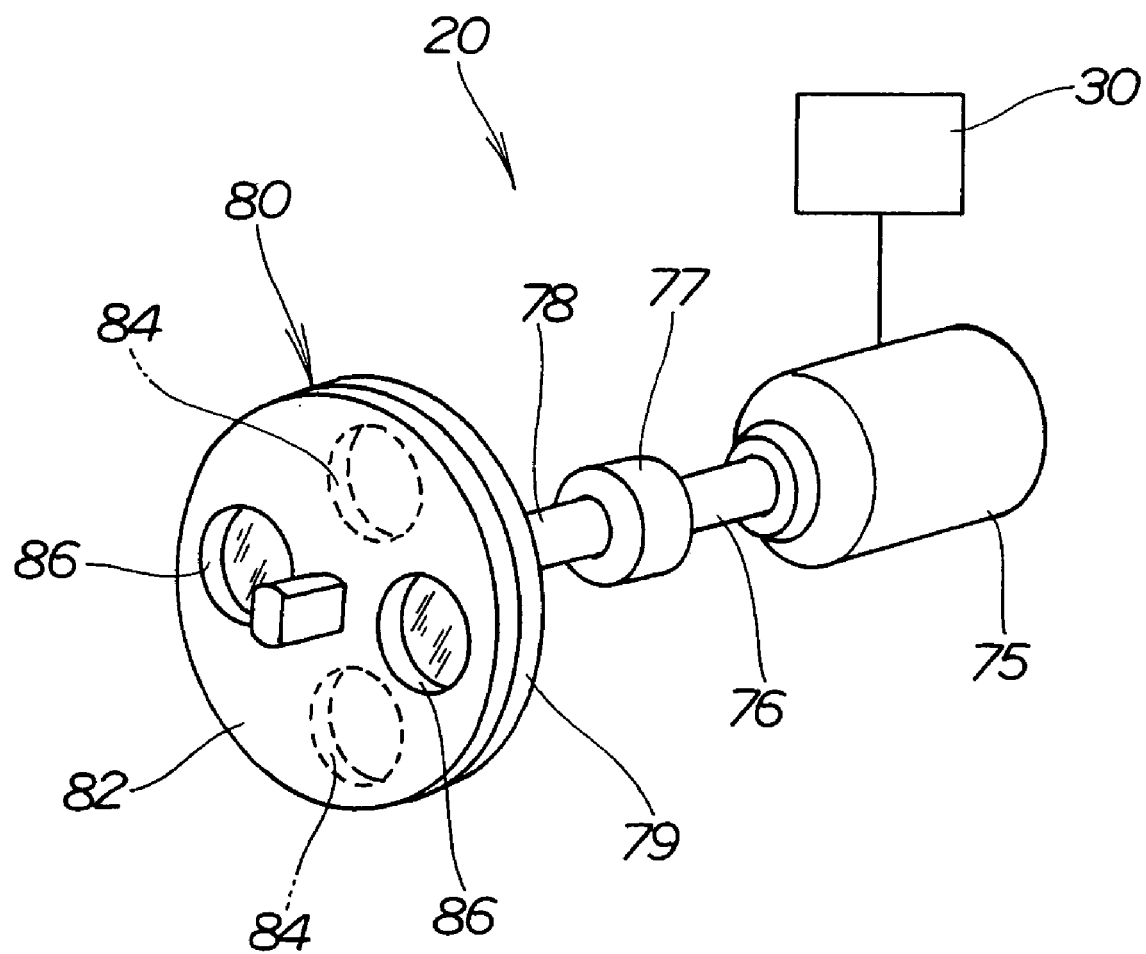
FIG. 9 is a diagram illustrating a closed state of the air outlet valve.
Figure 10:
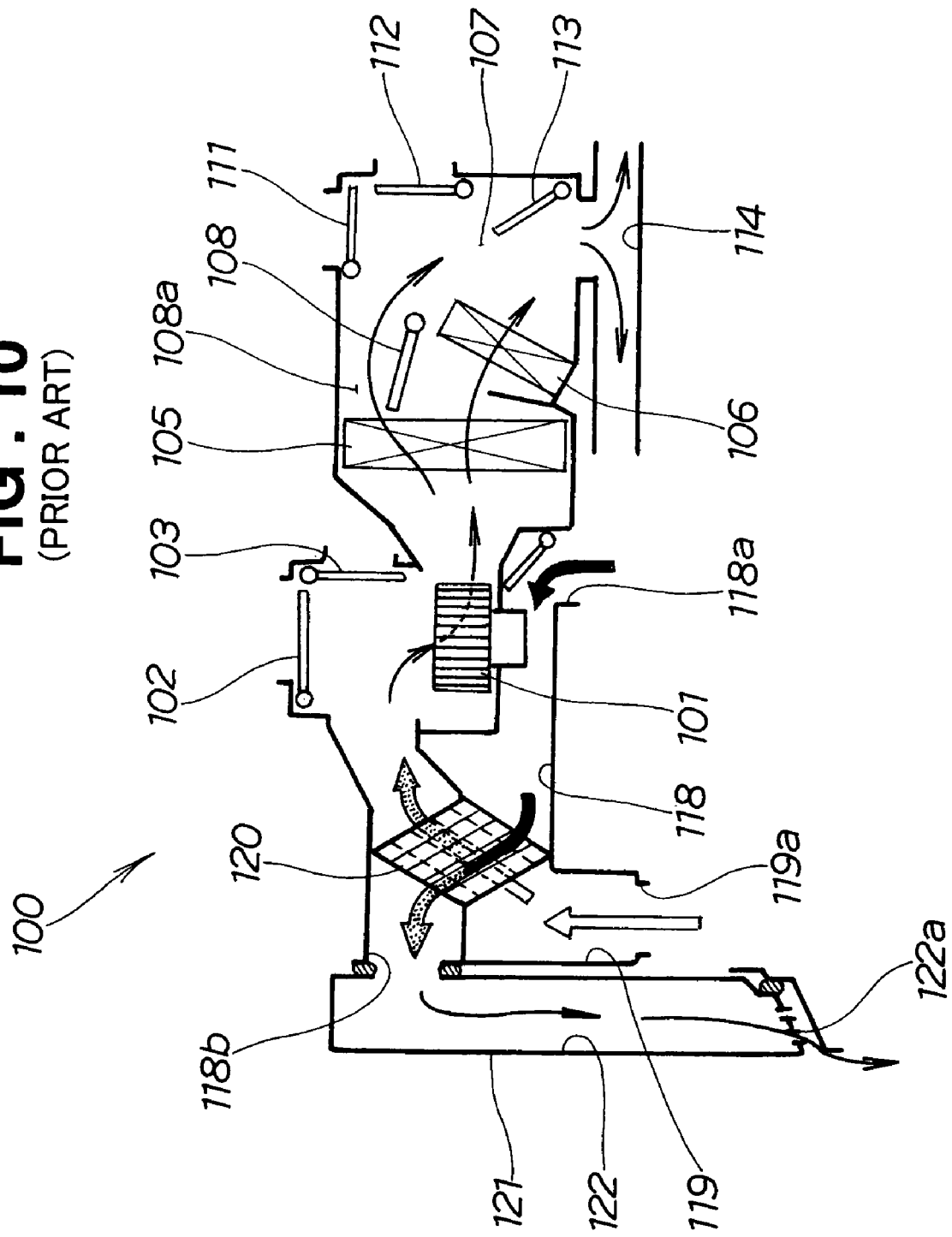
FIG. 10 is a diagram schematically illustrating an air-conditioning unit in a conventional vehicle air-conditioning system.

FIG. 9 illustrates the air outlet valve 80 in the air-conditioning system 10 in the closed state, and corresponds to ST08 in FIG. 4.

After the right front side door 21 shown in FIG. 8B is closed, the rotary plate 82 is reversely rotated 90° until the openings 86, 86 in the rotary plate 82 are 90° apart from the openings 84, 84 in the fixed plate 79.

After the rotary plate 82 is reversely rotated 90°, the drive motor 75 stops based on a stop signal from the controller 30. The air outlet valve 80 is closed, and the opening 85 is closed.

After the air outlet valve 80 is closed, the outside air introduction fan 45 (see FIG. 8B) is driven and kept rotating at middle speed, and also the inside air discharge fan 57 (see FIG. 8B) is driven and kept rotating at middle speed. With this, the vehicle air conditioning system 10 returns to the state in FIG. 5A, and continues normal operation.

After the right front side door 21 shown in FIG. 8B is closed, the air outlet 20 is controlled by the controller 30 to close the passages 87, 87 in the air outlet valve 80. With this, as illustrated with FIG. 5A, the passenger compartment 27 is kept communicating with the outside only through the inside air discharge passage 53. This results in an increase in the heat exchangeability of the heat exchanger 46 and an increase in the heating effect of the air-conditioning unit 15.

Next, the details of ST10 through ST15 in FIG. 4, that is, control when the $CO_2$ concentration (Dm) in the passenger compartment 27 exceeds the specified value (Dr) will be described with reference to FIG. 5A.

When the $CO_2$ concentration (Dm) in the passenger compartment 27 exceeds the specified value (Dr), the concentration detection sensor 26 detects the excess of the $CO_2$ concentration (Dm) over the specified value (Dr).

A detection signal indicating the excess of the $CO_2$ concentration (Dm) over the specified value (Dr) is sent from the concentration detection sensor 26 to the controller 30. Based on the detection signal, the controller 30 outputs an open-drive signal. Based on the open-drive signal, the drive motor 75 of the air outlet 20 rotation-drives the air outlet valve 80 to open. With this, as illustrated in FIG. 6B, the passages 87, 87 in the air outlet valve 80 are fully opened, and the opening 85 is kept open.

After the passages 87, 87 in the air outlet valve 80 are fully opened, rotation of the outside air introduction fan 45 is increased to the maximum, and also rotation of the inside air discharge fan 57 is increased to the maximum. With this, the amount of outside air introduction is increased to compensate for the amount of inside air discharged from the opening 85. As a result, inside air in the passenger compartment 27 is replaced with fresh outside air in a short period of time, and the $CO_2$ concentration (Dm) becomes lower than the specified value (Dr).

The compensation for the amount of inside air discharged from the opening 85 allows environmental conditions in the passenger compartment 27 to be desirably maintained.

The concentration detection sensor 26 detects the fact that the $CO_2$ concentration (Dm) in the passenger compartment 27 became lower than the specified value (Dr). The detection signal is not sent to the controller 30. The controller 30 controls rotation of the drive motor 75 of the air outlet 20 so that the air outlet valve 80 is closed, based on a close-drive signal.

As shown in FIG. 9, the air outlet valve 80 is closed to close the opening 85.

After the air outlet valve 80 is closed, the rotation of the outside air introduction fan 45 is returned to the middle speed and the rotation of the inside air discharge fan 57 is returned to the middle speed. With this, the vehicle air-conditioning system 10 returns to the normal state, and continues normal operation.

Next, control when the internal pressure (Pm) in the passenger compartment 27 exceeds the specified value (Pr) will be described with reference to FIGS. 5A, 6A, 6B and 9.

The control of the internal pressure (Pm) is substantially the same as the above-described control of the $CO_2$ concentration (Dm), and thus will not be described using a flowchart.

Referring to FIG. 5A, when the internal pressure (Pm) in the passenger compartment 27 exceeds the specified value (Pr), the internal pressure detection sensor 28 detects the excess of the internal pressure (Pm) over the specified value (Pr).

The internal pressure detection sensor 28 sends a detection signal indicating the excess of the internal pressure (Pm) over the specified value (Pr) to the controller 30. Based on the detection signal, the controller 30 controls rotation of the drive motor 75 of the air outlet 20 so that the air outlet valve 80 is opened. With this, as illustrated with FIG. 6B, the passages 87, 87 in the air outlet valve 80 are fully opened to keep the opening 85 open. Inside air is discharged form the opening 85, so that the internal pressure (Pm) becomes lower than the specified value (Pr).

The internal pressure detection sensor 28 detects that the internal pressure (Pm) in the passenger compartment 27 became lower than the specified value (Pr). The detection signal is not sent to the controller 30. The controller 30 controls rotation of the drive motor 75 of the air outlet 20 so that the air outlet valve 80 is closed.

As shown in FIG. 9, the air outlet valve 80 is closed, and the opening 85 is kept closed. With this, the air-conditioning system 10 returns to the normal state, and continues normal operation.

This embodiment has been described with an example of opening and closing the air outlet valve 80 of the air outlet 20 by the drive motor 75. However, the present invention is not limited thereto, and other drive means such as a shutoff solenoid may alternatively be used.

Also, this embodiment has been described with an example of setting rotation of the outside air introduction fan 45 and the inside air discharge fan 57 at middle speed. However, rotation of the outside air introduction fan 45 and the inside air discharge fan 57 can be selected as appropriate.

Also, this embodiment has been described with an example of controlling opening and closing of the air outlet valve 80 of the air outlet 20 according to the carbon dioxide ($CO_2$) concentration and the internal pressure in the passenger compartment 27. Alternatively, the opening and closing of the air outlet valve 80 of the air outlet 20 may be controlled according to other conditions of the inside air in the passenger compartment 27 (e.g., humidity).

Also, this embodiment has been described with an example of providing the concentration detection sensor 26 for detecting the carbon dioxide ($CO_2$) concentration at the floor 31 of the vehicle body 11 and providing the internal pressure detection sensor 28 at the roof 25. However, the mounting positions of the sensors 26 and 28 can be determined as desired. For example, if the internal pressure detection sensor 28 is provided at the floor 31, the same functions and effects can be obtained.

Obviously, various minor changes and modifications of the present invention are possible in the light of the above teaching. It is therefore to be understood that within the scope of the appended claims the invention may be practiced otherwise than as specifically described.

What is claimed is:

1. A vehicle air-conditioning system comprising:
   an outside air introduction passage for introducing outside air from outside a vehicle into a passenger compartment;
   a first fan provided in the outside air introduction passage for controlling a flow rate of the outside air introduced through the outside air introduction passage;
   an air-conditioner for heating or cooling the introduced outside air;
   an inside air discharge passage for discharging the air from the passenger compartment to outside the vehicle;

a second fan provided in the inside air discharge passage for controlling a flow rate of the inside air discharged through the inside air discharge passage;

a heat exchanger for exchanging heat between inside air introduced into the inside air discharge passage and outside air introduced into the outside air introduction passage;

an air outlet, separate from the inside air discharge passage, for enabling opening and closing of an opening provided for discharging inside air in the passenger compartment to outside the vehicle;

a vehicle door sensor for determining whether a door of the vehicle is closed or not, the vehicle door sensor generating a detection signal representing an open state or a closed state of the door of the vehicle;

an internal pressure detection sensor for detecting an internal pressure of the passenger compartment and generating a detection signal when the internal pressure of the passenger compartment exceeds a specified value; and control means, based on the detection signal from the vehicle door sensor and the internal pressure detection sensor, for controlling operation of the first fan, the second fan, and the air outlet such that when the detection signal from the vehicle door sensor represents the closed state of the door of the vehicle, the first and second fans are driven and the opening of the air outlet is kept closed until the internal pressure of the passenger compartment exceeds a specified value, and when the detection signal from the vehicle door sensor represents the open state of the door of the vehicle, the first and second fans are stopped and the opening of the air outlet is opened.

2. An air-conditioning system as set forth in claim 1, wherein the control means control operation of the first fan to increase the amount of outside air introduction into the outside air introduction passage when the opening of the air outlet is opened.

3. An air-conditioning system as set forth in claim 1, further comprising a $CO_2$ concentration sensor for detecting a concentration of carbon dioxide in the passenger compartment, wherein the control means, based on the concentration of carbon dioxide in the passenger compartment, controls operation of the first fan, the second fan, and the air outlet such that when the concentration of carbon dioxide in the passenger compartment, which is detected by the $CO_2$ concentration sensor, exceeds a specified value, the first and second fans are driven to increase the amount of outside air introduced into the outside air introduction passage and the amount of inside air discharged from the inside air discharged from the inside air discharge passage, and the opening of the air outlet is opened.

* * * * *